US011173883B2

(12) United States Patent
Nemeth et al.

(10) Patent No.: US 11,173,883 B2
(45) Date of Patent: Nov. 16, 2021

(54) SENSOR ARRANGEMENT AND A METHOD FOR DETECTING AN OBJECT AROUND A TRAILER OF A VEHICLE

(71) Applicant: KNORR-BREMSE SYSTEME FUER NUTZFAHRZEUGE GMBH, Munich (DE)

(72) Inventors: Huba Nemeth, Budapest (HU); Levente Balogh, Szigetszentmiklos (HU); Viktor Tihanyi, Budapest (HU); Laszlo Danos, Pecs (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 199 days.

(21) Appl. No.: 16/480,115

(22) PCT Filed: Jan. 24, 2018

(86) PCT No.: PCT/EP2018/051707
§ 371 (c)(1),
(2) Date: Jul. 23, 2019

(87) PCT Pub. No.: WO2018/138134
PCT Pub. Date: Aug. 2, 2018

(65) Prior Publication Data
US 2020/0039483 A1 Feb. 6, 2020

(30) Foreign Application Priority Data
Jan. 27, 2017 (EP) .................................. 17153513

(51) Int. Cl.
*B60T 7/22* (2006.01)
*B60T 8/17* (2006.01)
(Continued)

(52) U.S. Cl.
CPC .............. *B60T 7/22* (2013.01); *B60T 8/1708* (2013.01); *B60R 1/00* (2013.01); *B60T 8/171* (2013.01);
(Continued)

(58) Field of Classification Search
CPC ... G08G 1/166; G08G 1/167; B60W 2300/14; B60W 2520/22; B60W 2554/00;
(Continued)

(56) References Cited

U.S. PATENT DOCUMENTS 6,642,839 B1 * 11/2003 Gunderson ........... G01S 13/862
340/435
6,690,413 B1 * 2/2004 Moore ...................... B60R 1/00
348/148
(Continued)

FOREIGN PATENT DOCUMENTS

CN 203255120 U 10/2013
DE 102006026898 A1 12/2007
(Continued)

OTHER PUBLICATIONS

International Search Report dated Apr. 11, 2018, of the corresponding International Application PCT/EP2018/051707 filed Jan. 24, 2018.

*Primary Examiner* — Tyler J Lee
(74) *Attorney, Agent, or Firm* — Norton Rose Fulbright US LLP; Gerard Messina

(57) ABSTRACT

A sensor arrangement for detecting an object in a surrounding of a trailer when towed by a vehicle, the sensor arrangement including: at least one sensor mountable at a rear side of the vehicle with a field of view underneath the trailer and configured to capture a detection signal from the object; and a control unit configured to receive a sensor signal from the at least one sensor, wherein the sensor signal is indicative of the object and the control unit is configured to confirm a presence of the object behind or at a side of the trailer.

13 Claims, 4 Drawing Sheets

(51) Int. Cl.
    *B60R 1/00*     (2006.01)
    *B60T 8/88*     (2006.01)
    *B60T 8/171*    (2006.01)

(52) U.S. Cl.
    CPC ........... *B60T 8/885* (2013.01); *B60T 2201/02* (2013.01); *B60T 2230/06* (2013.01)

(58) Field of Classification Search
    CPC ................ B60W 30/08; B60T 2201/02; B60T 2230/06; B60T 7/22; B60T 8/1708; B60T 8/171; B60T 8/885; B60R 1/00
    See application file for complete search history.

(56) References Cited

U.S. PATENT DOCUMENTS

| | | | |
|---|---|---|---|
| 8,473,173 | B1 | 6/2013 | Robles |
| 9,020,730 | B2* | 4/2015 | Agnew .................... B60T 7/22 701/78 |
| 9,291,491 | B2* | 3/2016 | Tran ........................ G01S 15/10 |
| 10,007,262 | B1* | 6/2018 | Schwindt ........... G06K 9/00805 |
| 2005/0159875 | A1* | 7/2005 | Chia ..................... G01S 13/931 701/93 |
| 2007/0198190 | A1 | 8/2007 | Bauer et al. |
| 2010/0066527 | A1* | 3/2010 | Liou ...................... B60Q 9/008 340/461 |
| 2010/0292895 | A1* | 11/2010 | Nakamura ......... G08G 1/09623 701/41 |
| 2014/0303849 | A1* | 10/2014 | Hafner .................. B60W 50/14 701/42 |
| 2016/0016512 | A1* | 1/2016 | Masutani .................. B60R 1/00 340/435 |
| 2018/0001836 | A1* | 1/2018 | Pan ....................... B60R 13/105 |

FOREIGN PATENT DOCUMENTS

| | | |
|---|---|---|
| DE | 102016001189 A1 | 8/2016 |
| EP | 1386774 A1 | 2/2004 |
| JP | 2007043530 A | 2/2007 |
| JP | 2008077628 A | 4/2008 |
| JP | 2012246828 A | 12/2012 |
| JP | 2014102770 A | 6/2014 |
| JP | 2017210017 A | 11/2017 |

* cited by examiner

SENSOR ARRANGEMENT AND A METHOD FOR DETECTING AN OBJECT AROUND A TRAILER OF A VEHICLE

FIELD OF THE INVENTION

The present invention relates to a sensor arrangement for a vehicle or a tractor of a vehicle combination, a method of using the sensor arrangement, and, in particular, to a rear-looking environment sensor placement.

BACKGROUND INFORMATION

The autonomous operation of transport vehicles is a field of increased interest. More and more functions are to be integrated in the hardware infrastructure of the vehicle including different types of sensors as well as perception technologies. In present technologies the automation level still requires the presence and attention of a driver of the vehicle. However, the next level of systems should be manageable to perform an automatic driving without the continuous attention of the driver and thus need improved environment detection capabilities.

Commercial vehicles at the present stage of technology may comprise forward-looking sensors as for example a long-range radar for adaptive cruise control (ACC) and for advanced emergency braking systems (AEBS) and a mid-range camera for lane departure warning systems (LDWS). For example, EP 1 386 774 discusses a control apparatus for brakes of commercial vehicles with a front-looking radar, JP 2012-246828 discloses a vehicle front-mounted camera used for LDWS and idle reduction, and CN 203255120 discusses an AEBS system with a front radar and other sensors.

However, in case of highly-automated vehicles, where the driver is not anymore in the control loop, a full rearview coverage is needed, which includes the rear area of the trailer. For example, for automatic lane changing capabilities, which is not fully covered by conventional systems, the close proximity of the trailer back area being a blind spot for the rear-looking mirrors of the driver shall also be monitored reliably. Known systems are not able to provide a reliable detection mechanism for objects located directly behind the vehicle or at a side of the vehicle.

Therefore, there is a demand for sensor arrangements that are able to be used for vehicles that are able to tow trailers and provide a reliable coverage of the blind spot behind the trailer.

SUMMARY OF THE INVENTION

At least some of the problems as described before are overcome by a sensor arrangement as described herein or a method as described herein. The further descriptions herein refer to further advantageous realizations of the subject matters further defined in the specification.

The present invention relates to a sensor arrangement for detecting an object in a surrounding of a trailer when towed by a vehicle. The sensor arrangement comprises: at least one sensor mountable at a rear side of the vehicle with a field of view underneath the trailer and configured to capture a detection signal from the object. The sensor arrangement further comprises a control unit configured to receive a sensor signal from the at least one sensor, wherein the sensor signal is indicative of the object and the control unit is configured to confirm a presence of the object behind or at a side of the trailer.

It is understood that the vehicle or the trailer is not part of the claimed sensor arrangement. The sensor arrangement is, however, adapted (e.g. by installing a suitable software in the control unit) to perform the detection when it will be mounted on the vehicle. The detection signals from the object may be any signals that originate from the object, whether or not these signals are reflected or emitted by the object. The field of view may at least be part of the captured area or the viewing direction.

Optionally, the control unit is configured to alert a driver or an autonomous management system of the vehicle about the presence of the object behind or at a side of the trailer. The driver alert may e.g. include an optical, acoustic or haptic signal provided to the driver.

The control unit may further be configured to determine a distance from the object to the rear side of the vehicle or to the rear side of the trailer. To achieve this function, the control unit may acquire information about a length of the trailer from a data base or any storage device on the vehicle and takes this length information into account. The control unit may further be configured to use this length information to ignore all potential detection signals received from positions under the trailer.

The control unit may also be configured to distinguish sensor signals received from components of the trailer (or any other obstacle) and the detection signal received from the object. Optionally, these sensor signals received from the components of the trailer may be ignored when confirming the presence of the object. Hence, the control unit may consider sensor signal only from the object in the process of confirming the presence.

Optionally, the control unit is configured to detect (or scan) the trailer itself or one or more of its components (e.g. at the begin of the trip). The control unit may also repeatedly detect the trailer to identify relative motions of the trailer when compared to the vehicle. The knowledge of the trailer or its components may be used to distinguish signals received from the object (=detection signals) from signals received from the trailer.

Thus, the control unit may be configured to determine an articulation angle between the vehicle and the trailer based on the detection of the trailer or at least one of its components.

Optionally, the control unit is configured to detect the object based on signals reflected by ground or an obstacle between the object and the at least one sensor (or by a house, wall or other vehicles).

Optionally, the at least one sensor comprises at least one of the following units: a radar, an ultrasonic sensor, a Lidar, a camera, or any other type of environment sensor.

The at least one sensor may also comprise at least two sensor units to capture at least two views from different perspectives. As a result, the control unit may be configured to receive from each of the at least two sensors a respective sensor signal and to use the at least two sensor signals for at least one of the following functions: to generate a stereographic picture, to determine a distance to the object, improving a detection accuracy based on a signal redundancy (e.g. using one detection signal as confirmation of the other detection signal).

The present invention relates also to a vehicle with one the mentioned sensor arrangement. The vehicle may be a commercial vehicle or a tractor of a vehicle combination. The control unit may be any control unit present in the vehicle or part thereof. The functions may be implemented by suitable software installed on such a control unit.

The present invention relates also to a method for detecting an object in a surrounding of a trailer when towed by a vehicle. The method comprises the following steps:

causing at least one sensor at a rear side of the vehicle with a field of view underneath the trailer to capture a detection signal from the object;

causing a control unit to receive a sensor signal from the at least one sensor, wherein the sensor signal is indicative of the object; and confirming a presence of the object behind or at a side of the trailer.

This method may also be implemented in software or a computer program product or a software module in an electronic control unit. Therefore, embodiment relate also to a computer program having a program code for performing the method, when the computer program is executed on a processor.

When compared to conventional systems, embodiments of the present invention provide the following advantages. Although any sensor installed on the trailer can also be used for environment detection, currently there is no standardized interface between the tractor and the trailer of commercial vehicle combinations available that is able to transfer environment sensing information from the trailer back to the tractor. Since tractors are usually used with different trailers, the conventional environment detection depends on the installation of the particular trailer. Therefore, embodiments of the present invention can particularly be used for such vehicle combinations where the system of the tractor is incompatible to the sensor arrangements installed on the trailer. Consequently, embodiments are of benefit for providing an environment sensing of all zones around the vehicle—not only the front, left and right zones. These zones are covered solely from the tractor. In particular, however, the sensing does not rely on the specific trailer, but is independent of the trailer and can be used for almost any trailer—as long as there is a sufficient viewing arear underneath the trailer.

This effect is achieved by providing a sensor arrangement that captures sensor data from below the trailer and is thus able to detect the environment around the trailer from the tractor and is especially capable of monitoring the rear zone of the trailer. To interpret the sensor signals correctly, the control unit is configured to take into account possible components of the trailer. Therefore, there is no need to install sensors on the trailer. This provides the advantage that the trailer and the possibly installed sensors on the trailer do not need to be compatible with the tractor system.

Some examples of the arrangement and/or methods will be described in the following by way of examples only, and with respect to the accompanying figures.

DETAILED DESCRIPTION

Figure 1:
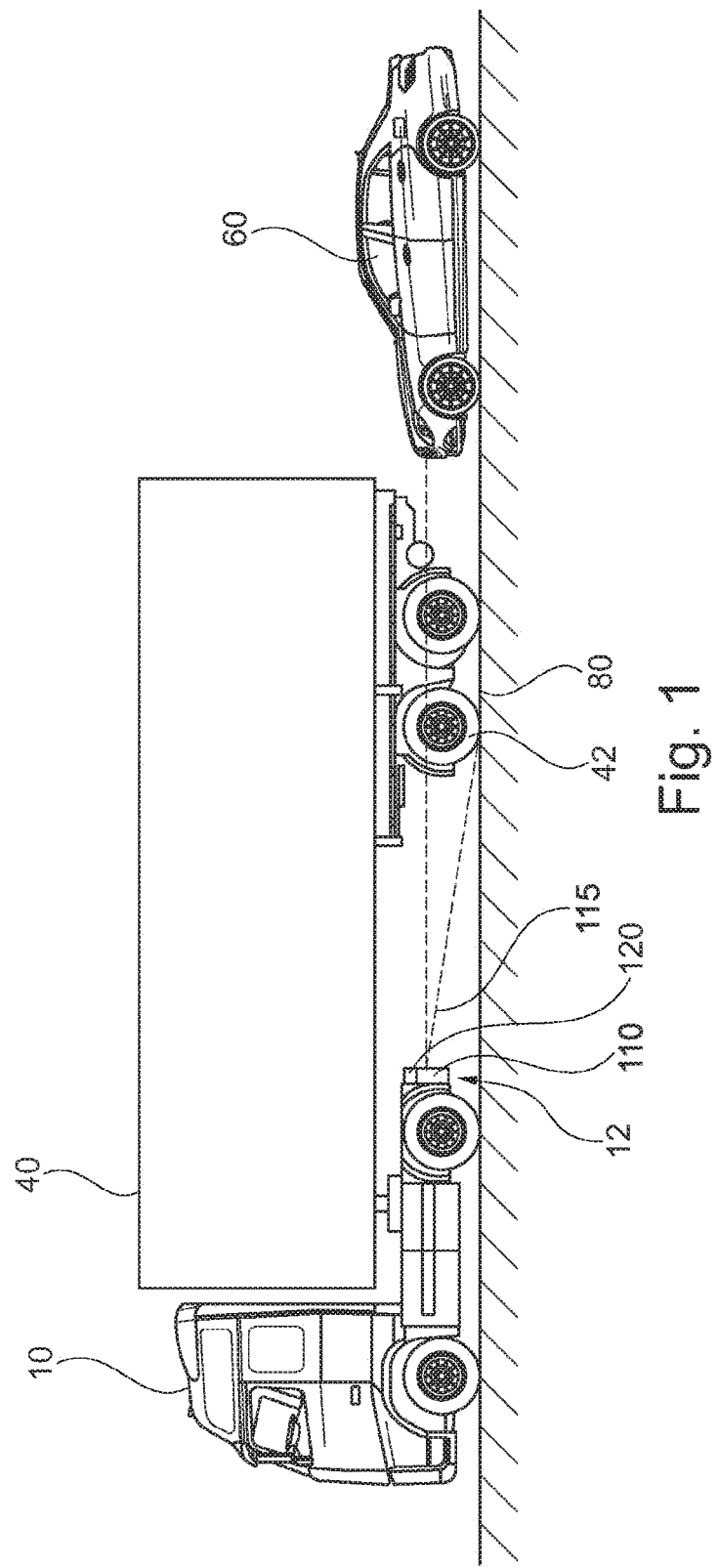
FIG. 1 depicts a sensor arrangement for detecting objects according to an embodiment of the present invention.

FIG. 1 depicts a sensor arrangement, which is suitable for detecting an object 60 in a surrounding of a trailer 40 when towed by a vehicle or tractor 10. The sensor arrangement comprises at least one sensor 110 and a control unit 120 that may or may not be accommodated in a common housing. The at least one sensor 110 is configured to receive detection signals from objects 60 in the surrounding of the vehicle 10 and is further configured to be mounted at a rear side 12 of the vehicle 10 with a viewing direction 115 underneath the trailer 40. The control unit 120 is configured to receive a sensor signal from the at least one sensor 110. The sensor signal is indicative of the object 60 present behind or at the side of the trailer 40. The control unit 120 is also configured to confirm the presence of the object 60.

The control unit 120 may further be configured to be connected to a trailer bus system or may be connected by any other arrangement (e.g. wireless or by signal lines) with another electronic control unit of the vehicle 10 to provide information about a detected object 60. The object 60 may, for example, be another vehicle traveling behind the vehicle combination 10, 40 (e.g. in a blind spot). It may also be a person or any other object present in the surrounding of the vehicle combination 10, 40. The control unit 120 is, in particular, configured to differentiate signals received from the viewing direction 115 with respect to the origin of these signals. For example, the control unit 120 may identify components of the trailer 40 as, for example, the wheels 42 or the axles or any other component of the trailer 40. Those signals can, for example, be filtered in order to use only signals received from an object 60 which is not part of the vehicle combination 10, 40 as a potential detection signal which may trigger an alert provided to the driver of the vehicle 10 or to an autonomous driving management. The signals received from the object 40 may be optical signals or radar signals which may or may not be reflected by the ground 80 (for example the road). Therefore, the control unit 120 may be configured, based on stored software, to interpret the received signals by the at least one sensor 110 correctly in order to be able to distinguish between various components of the trailer 40 from objects of interest 60.

Therefore, this sensor arrangement allows to cover the blind spot behind the trailer which is normally invisible from the tractor since, the mirrors of the driver do not cover this area. The invention uses the trailer floors that are often only partially blocked so that a rear view from the tractor becomes possible, when sensors are placed appropriately. This enables a full rear coverage of tractor-trailer combinations needed for future autonomous driving.

Figure 2:
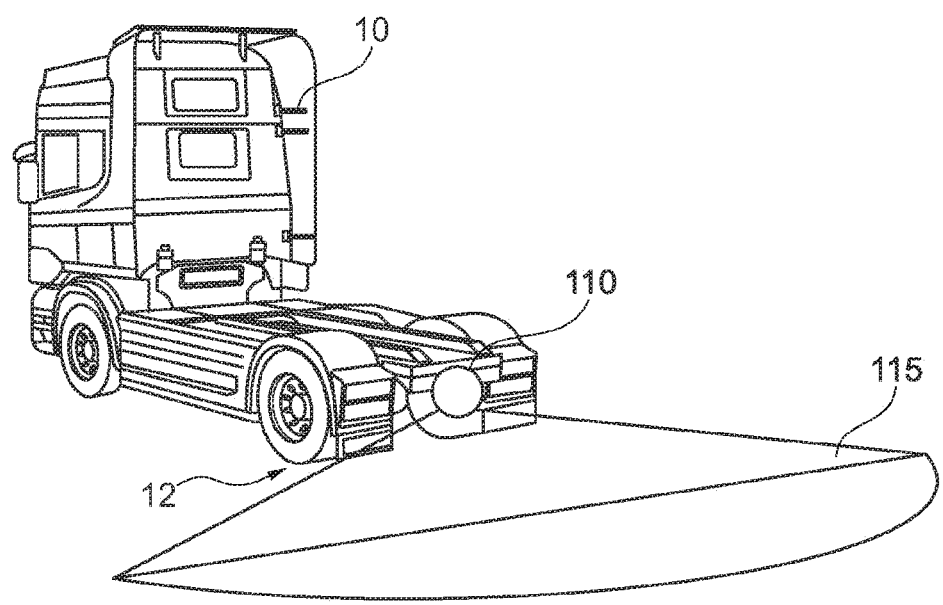
FIG. 2 illustrates a placement of a rear looking sensor on a commercial vehicle rear face.

FIG. 2 depicts an arrangement for a semitrailer tractor 10 as an example for a commercial vehicle. The at least one sensor 110 is installed on the backside 12 of the vehicle 10 to cover a rear viewing range 115. The at least one sensor 110 is, for example, attached to the vehicle 10 at a position enabling to monitor a range just above the road. Moreover, the at least one sensor 110 may be configured to detect also reflected signals in the detection area 115 which are reflected from an obstacle behind the rear side 12 of the vehicle 10. Therefore, the rear looking sensor(s) 110 placed to the rear face 12 of the tractor 10 can capture the region 115 underfloor of the trailer.

The invention is not restricted on a single sensor mounted to the tractor 10. Instead, it is also possible to mount at least two sensors 111, 112 on the tractor 10. As a result, two sensor signals can be obtained independently of each other so that the redundancy improves the reliability in the detection of possible objects around the exemplary tractor 10. Furthermore, a stereographic image can be generated from the rear side of the exemplary tractor 10 which enables, for example, the determination of the distance to the object or a possible movement of the object in the surrounding of the exemplary tractor 10.

The sensor(s) 110 may be able to see both the trailer 40 as a close object, but also underfloor objects such as the axles that are partly blocking the sensor (e.g. a radar) to see other objects behind or besides the trailer 40. Although a part of the exemplary radar wave may be reflected by the ground surface 80, these signals can nevertheless be detected by the one or more sensors 110. It should be appreciated that the invention shall not be limited on particular types of sensors or particular types of tractors 10. Thus, the at least one sensor 110 can be placed virtually anywhere on the tractor 10—as long as a desired viewing rang 115 (e.g. the underfloor of the trailer) can still be covered.

Figure 3:
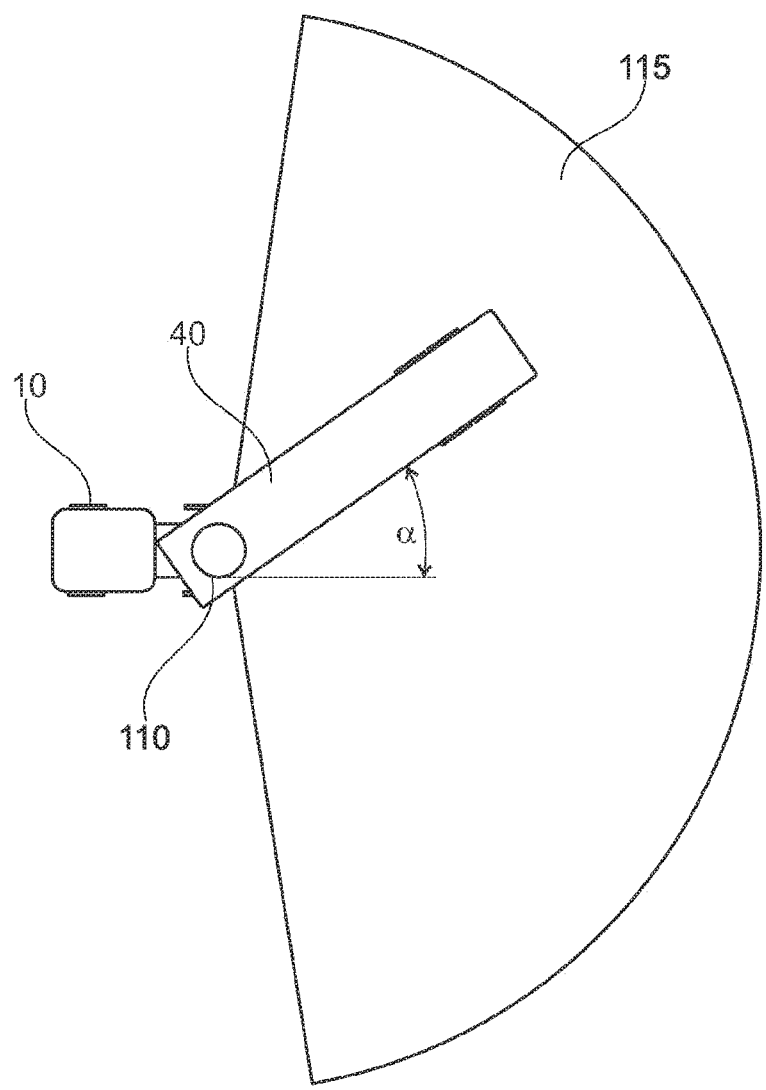
FIG. 3 depicts a field of view of a rear viewing environment sensor for the commercial motor vehicle for automated operation.

FIG. 3 shows an overview on the vehicle combination with a tractor 10 and an exemplary trailer 40. The at least one sensor 110 is again attached to the tractor 10 and covers the area 115 which extends not only to the rear side of the tractor 10 but also to the left-hand side and right-hand side of the tractor 10 and the trailer 40. Therefore, it becomes possible to identify objects which are located at the side of the tractor 10.

According to this embodiment the at least one sensor 110 has an appropriate field of view 115. For example, the sensor(s) 110 may be a sensor with a wide viewing angle range so that also objects besides the trailer 40 can be detected—even if the trailer 40 is articulated compared to the tractor 10. This may be achieved as follows. The sensor installation provides a continuous coverage of the trailer 40 itself. Therefore, the control unit 120 can identify at least one underfloor component of the trailer 40 and track its position in time. As a result, an articulation angle α between the tractor 10 and the trailer 40 can be determined from the actual position of the underfloor components of the trailer 40. The underfloor component may be an axle or support legs of the trailer 40 and their position or position change can be compared to their baseline straight position(s), which can be obtained from the tracking information in time.

Figure 4:
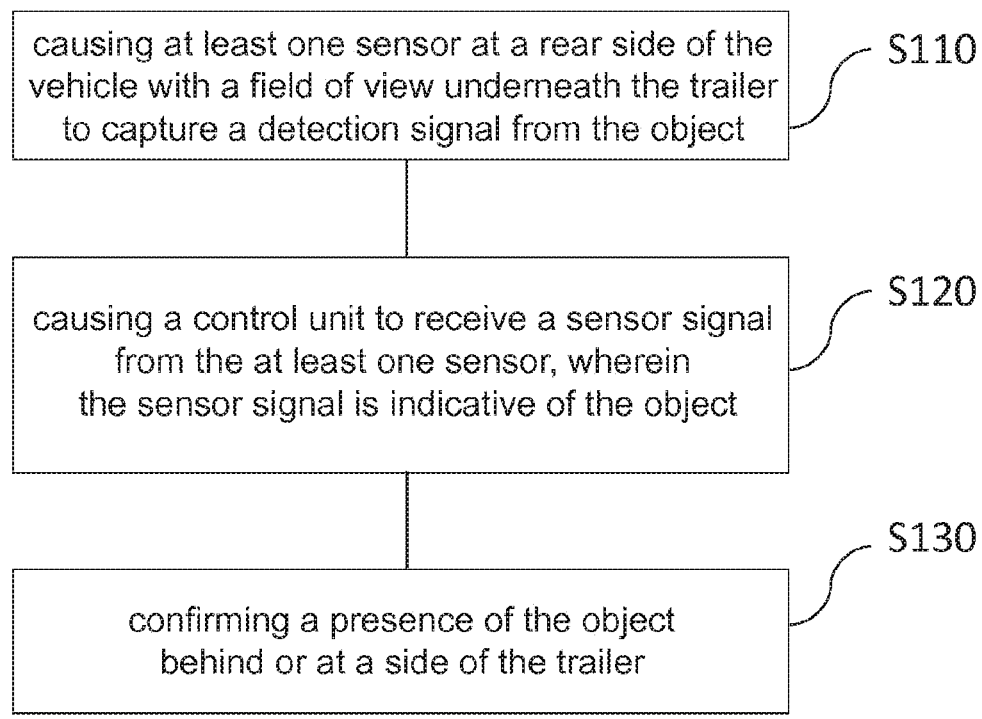
FIG. 4 depict a flow diagram of a method for detecting the objects.

FIG. 4 depicts a flow diagram of a method for detecting the object 60 in a surrounding of the trailer 40 when towed by the vehicle 10. The method comprises the steps of:
causing S110 at least one sensor 110 at a rear side of the vehicle 10 with a field of view underneath the trailer 40 to capture a detection signal from the object 60;
causing S120 a control unit 120 to receive a sensor signal from the at least one sensor 110, wherein the sensor signal is indicative of the object; and
confirming S130 a presence of the object 60 behind or at a side of the trailer 40.

A person of skill in the art would readily recognize that steps of various above-described methods may be performed by programmed computers. Thus, this method may also be a computer-implemented method. Embodiments are also intended to cover program storage devices, e.g., digital data storage media, which are machine or computer readable and encode machine-executable or computer-executable programs of instructions, wherein the instructions perform some or all of the acts of the above-described methods, when executed on the a computer or processor.

In comparison to conventional systems, advantageous embodiments of the present invention relate particularly to:

A sensor arrangement for a commercial vehicle or vehicle combination operated without continuous driver supervision, providing collision avoidance and environment detection, wherein a sensor 110 is placed to the tractor 10 in such a way that it can see rear and/or side objects of the trailer 40 from underfloor of the trailer. In this sensor arrangement at least one of the following features may be realized:
- the sensor(s) 110 may be placed to the rear of the tractor or towing vehicle 10;
- the sensor(s) 110 may be radar, an ultrasonic sensor, a Lidar, a camera or any other type of environment sensor;
- the sensor(s) 110 may provide detection of objects 60 behind or besides the trailer;
- the sensor(s) 110 may provide detection of the trailer itself or its components;
- a computer system may determine the articulation angle between the tractor and trailer from the detection of the trailer or its components.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

THE LIST OF REFERENCE SIGNS IS AS FOLLOWS 10 vehicle
12 rear-side of the vehicle
40 trailer
42 exemplary component of the trailer
60 object
80 ground
110 at least one sensor
115 viewing area
120 control unit
α articulation angle

The invention claimed is:

1. A sensor arrangement for detecting an object in a surrounding of a trailer when towed by a vehicle, comprising:
at least one sensor mountable at a rear side of the vehicle with a viewing direction and a field of view underneath the trailer, wherein the at least one sensor is configured to capture a detection signal from the object; and
a control unit to receive a sensor signal from the at least one sensor, wherein the sensor signal is indicative of the object and the control unit is configured to confirm a presence of the object behind or at a side of the trailer;
wherein the vehicle and the trailer are a vehicle combination,
wherein the control unit is configured to differentiate signals received from a viewing direction with respect to the origin of the sensor signals,
wherein the sensor signals are filtered to use only signals indicative of the object, which is not part of a vehicle combination as a detection signal to trigger an alert provided to a driver of the vehicle or to an autonomous driving management device, and
wherein the sensor arrangement allows for covering a blind spot behind the trailer which is normally invisible from the tractor, since mirrors of the driver do not cover the blind spot.

2. The sensor arrangement of claim 1, wherein the control unit is configured to alert a driver or an autonomous driving management system of the vehicle about the presence of the object behind or at a side of the trailer.

3. The sensor arrangement of claim 1, wherein the control unit is configured to determine a distance from the object to the rear side of the vehicle or to the rear side of the trailer.

4. The sensor arrangement of claim 1, wherein the control unit is configured to distinguish sensor signals received from components of the trailer and the detection signal received from the object, and is configured to ignore sensor signals received from the components of the trailer when confirming the presence of the object.

5. The sensor arrangement of claim 1, wherein the control unit is configured to detect the trailer itself or one of its components.

6. The sensor arrangement of claim 5, wherein the control unit is configured to determine an articulation angle between the vehicle and the trailer based on the detection of the trailer or at least one of its components.

7. The sensor arrangement of claim 1, wherein the control unit is configured to detect the object based on signals reflected by ground or an obstacle between the object and the at least one sensor.

8. The sensor arrangement of claim 1, wherein the at least one sensor includes at least one of the following: a radar, an ultrasonic sensor, a Lidar, a camera and/or another environmental sensor.

9. The sensor arrangement of claim 1, wherein the at least one sensor includes at least two sensor units to capture at least two views from different perspectives.

10. The sensor arrangement of claim 9, wherein the control unit is configured to receive from each of the at least two sensors a respective sensor signal and to use the at least two sensor signals for at least one of the following functions: generating a stereographic picture, determining a distance to the object, and improving a detection accuracy based on a signal redundancy.

11. A vehicle, comprising:
a sensor arrangement for detecting an object in a surrounding of a trailer when towed by a vehicle, including:
at least one sensor mountable at a rear side of the vehicle with a field of view underneath the trailer and configured to capture a detection signal from the object; and
a control unit to receive a sensor signal from the at least one sensor, wherein the sensor signal is indicative of the object and the control unit is configured to confirm a presence of the object behind or at a side of the trailer;
wherein the vehicle and the trailer are a vehicle combination,
wherein the control unit is configured to differentiate signals received from a viewing direction with respect to the origin of the sensor signals,
wherein the sensor signals are filtered to use only signals indicative of the object, which is not part of a vehicle combination as a detection signal to trigger an alert provided to a driver of the vehicle or to an autonomous driving management device, and
wherein the sensor arrangement allows for covering a blind spot behind the trailer which is normally invisible from the tractor, since mirrors of the driver do not cover the blind spot.

12. A method for detecting an object in a surrounding of a trailer when towed by a vehicle, the method comprising:
capturing, via at least one sensor at a rear side of the vehicle with a field of view underneath the trailer, a detection signal from the object;
receiving, via a control unit, a sensor signal from the at least one sensor, wherein the sensor signal is indicative of the object; and
confirming a presence of the object behind or at a side of the trailer;
wherein the vehicle and the trailer are a vehicle combination,
wherein the control unit is configured to differentiate signals received from a viewing direction with respect to the origin of the sensor signals,
wherein the sensor signals are filtered to use only signals indicative of the object, which is not part of a vehicle combination as a detection signal to trigger an alert provided to a driver of the vehicle or to an autonomous driving management device, and
wherein the sensor arrangement allows for covering a blind spot behind the trailer which is normally invisible from the tractor, since mirrors of the driver do not cover the blind spot.

13. A non-transitory computer readable medium having a computer program, which is executable by a processor, comprising:
a program code arrangement having program code for detecting an object in a surrounding of a trailer when towed by a vehicle, by performing the following:
capturing, via at least one sensor at a rear side of the vehicle with a field of view underneath the trailer, a detection signal from the object;
receiving, via a control unit, a sensor signal from the at least one sensor, wherein the sensor signal is indicative of the object; and
confirming a presence of the object behind or at a side of the trailer;
wherein the vehicle and the trailer are a vehicle combination,
wherein the control unit is configured to differentiate signals received from a viewing direction with respect to the origin of the sensor signals,
wherein the sensor signals are filtered to use only signals indicative of the object, which is not part of a vehicle combination as a detection signal to trigger an alert provided to a driver of the vehicle or to an autonomous driving management device, and
wherein the sensor arrangement allows for covering a blind spot behind the trailer which is normally invisible from the tractor, since mirrors of the driver do not cover the blind spot.

* * * * *